US007188097B2

(12) United States Patent
Na et al.

(10) Patent No.: US 7,188,097 B2
(45) Date of Patent: Mar. 6, 2007

(54) OPTIMAL HIGH-SPEED MULTI-RESOLUTION RETRIEVAL METHOD ON LARGE CAPACITY DATABASE

(75) Inventors: Jong Bum Na, Taejon (KR); Byung Chul Song, Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 584 days.

(21) Appl. No.: 09/781,291

(22) Filed: Feb. 13, 2001

(65) Prior Publication Data

US 2003/0149679 A1   Aug. 7, 2003

(30) Foreign Application Priority Data

Feb. 12, 2001  (KR) ............................... 2000-50418

(51) Int. Cl.
*G06F 17/30* (2006.01)
(52) U.S. Cl. ............................... 707/2; 707/3; 707/101
(58) Field of Classification Search .................... 707/2, 707/3, 101
See application file for complete search history.

(56) References Cited

U.S. PATENT DOCUMENTS

2002/0002550 A1* 1/2002 Berman ........................ 707/3

OTHER PUBLICATIONS

Andrew P. Berman, Linda G. Shapiro; "Efficient Content-Based Retrieval: Experimental Results", Content-Based Access of Image and Video Libraries, 1999. (CBAIVL '99) Proceedings, IEEE Workshop on, Jun. 22, 1999, pp. 55-61.*
Andrew P. Berman, Linda G. Shapiro; "A Flexible Image Database System for Content-Based Retrieval", Pattern Recognition, 1998. Proceedings. Fourteenth International Conference on, vol. 1, Aug. 16-20, 1998, pp. 894-898 vol. 1.*
Krishnamachari, S.; Abdel-Mottaleb, M.; "Image browsing using hierarchical clustering", Computers and Communications, 1999 Proceedings. IEEE International Symposium on, Jul. 6-8, 1999, pp. 301-307.*

* cited by examiner

*Primary Examiner*—Jean M. Corrielus
(74) *Attorney, Agent, or Firm*—Bacon & Thomas, PLLC

(57) ABSTRACT

An optimal high-speed multi-resolution retrieval method includes the steps of sorting all data contained in a database into a desired number of clusters each composed of data having similar features, deriving the lower bound of the distance between each cluster and a query, removing clusters having no possibility to be determined as best matches, searching, for best matches, data of clusters having the possibility to be determined as best matches, and inducing an inequality property based on a multi-resolution data structure for reducing unnecessary feature matching computation involved in a search procedure to reduce a large quantity of calculation.

9 Claims, 3 Drawing Sheets

OPTIMAL HIGH-SPEED MULTI-RESOLUTION RETRIEVAL METHOD ON LARGE CAPACITY DATABASE

BACKGROUND OF THE INVENTION

1. Field of the Invention

The present invention relates to an optimal high-speed multi-resolution retrieval method on a large capacity database, and more particularly to a technique for inducing an inequality capable of allowing an accurate and rapid retrieval of desired information from a database, and implementing an optimal high-speed information retrieval using the induced inequality.

2. Description of the Related Art

In order to search for the best match to a query based on a similarity measure, an exhaustive search should be performed literally for all data contained in a database. However, straightforward exhaustive search algorithms require a large quantity of calculation. Thus, a variety of high-speed search algorithms have recently been proposed.

Berman and Shapiro have proposed introduction of a triangular inequality so as to remove candidates having no possibility to be determined as the best match(es), from a retrieval procedure. For a reduction of additional calculation quantity, they have also proposed to simultaneously use diverse distance measures and representative data called "key data". However, this method involves a considerable variation in retrieval speed depending on "key data", and exhibits an insufficient speed performance in association with large capacity databases.

Recently, Berman and Shapiro has also proposed the application of a data structure called a "Triangle Trie" to achieve an improvement in performance. In this method, however, there is still a problem in that the retrieval speed is considerably influenced by the tree depth and threshold value of "key data".

Meanwhile, Krishnamachari and Mottaleb have proposed a cluster-based indexing algorithm in which diverse data contained in a database are partitioned into clusters in such a fashion that each cluster contains data having similar features, in accordance with an architectural clustering scheme.

In accordance with the cluster-based indexing algorithm, it is possible to remarkably reduce the quantity of calculation because query data is not compared with all data contained in a database, but compared with a part of the data in a retrieval procedure in accordance with the clustering scheme.

In particular, the cluster-based indexing algorithm is suitable for large capacity databases in that the number of comparisons to obtain a desired retrieval accuracy is not linearly proportional to the capacity of the database.

FIG. 1 is a schematic diagram illustrating problems involved in conventional cluster-based search algorithms.

Referring to FIG. 1, the second cluster is selected as a candidate because its center $C_2$ is nearest to the query Q. In accordance with the illustrated search algorithm, an element $X_2$ in the second cluster is selected as the best match, based on the distance of each element belonging to the second cluster from the query Q. However, the actual best match is the element $X_8$ of the fist cluster.

The reason why such a problem occurs is that the center of the cluster, to which the actual best match belongs, is not always nearest to the query Q. To this end, a method for simultaneously searching for several near clusters has been proposed. However, this method cannot ensure an optimal retrieval inherently.

Also, the conventional cluster-based search algorithms, which cannot ensure an optimal retrieval, have a drawback in that they cannot provide a retrieval speed sufficiently rapid to obtain a satisfactory retrieval accuracy.

SUMMARY OF THE INVENTION

Therefore, the present invention has been made to solve the above mentioned problems, and an object of the invention is to provide an optimal high-speed multi-resolution retrieval method on a large capacity database for inducing an inequality capable of accurately determining effective clusters and ineffective clusters, and implementing an optimal high-speed information retrieval using the induced inequality.

Another object of the invention is to provide an optimal high-speed multi-resolution retrieval method on a large capacity database for inducing an inequality based on a multi-resolution data structure for a high-speed processing, and implementing an optimal high-speed multi-resolution retrieval using the induced inequality.

In accordance with the present invention, these objects are accomplished by providing an optimal high-speed multi-resolution retrieval method on a large capacity database, comprising the steps of: partitioning all data contained in a database into a desired number of clusters each composed of data having similar features; deriving the lower bound of the distance between each cluster and a query, removing clusters having no possibility to be determined as the best matches, and searching, for best matches, data in clusters having the possibility to be determined as the best matches; and inducing an inequality property based on a multi-resolution data structure for reducing unnecessary feature matching computation involved in a search procedure to reduce a large quantity of calculation.

In accordance with this method, it is possible to accurately search not only for a single best match, but also for a plurality of more-significant best matches.

BRIEF DESCRIPTION OF THE DRAWINGS

The above objects, and other characteristics and advantages of the present invention will become more apparent after a reading of the following detailed description when taken in conjunction with the drawings, in which.

DESCRIPTION OF THE PREFERRED EMBODIMENTS

Now, the configuration and effects of a preferred embodiment of the present invention will be described in detail with reference to the annexed drawings.

Figure 2:
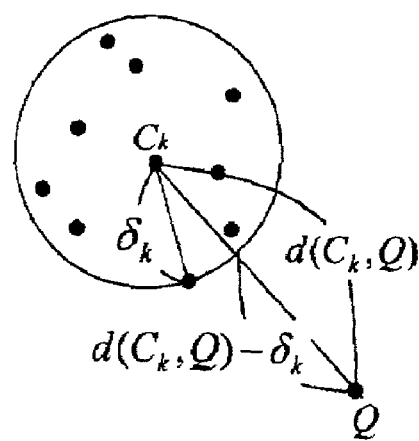
FIG. 2 is a schematic diagram illustrating distance inequality features for an optional cluster in accordance with the present invention.

FIG. 2 is a schematic diagram illustrating distance inequality property for an optional cluster in accordance with the present invention.

Prior to a description of the distance inequality property for an optional cluster in accordance with the present invention, the clustering procedure for a database will be described.

In accordance with the clustering procedure, the database is first divided into a predetermined number of clusters, that is, K clusters, using a MacQueen K-means clustering method, in order to allow data having similar features to compose one cluster.

Here, the image data features may include information such as color, texture, and shape. In the case of audio data, information such as pitch may be usable for data features. Each of the K clusters has a mean center thereof.

Since the computation required in the clustering procedure is conducted irrespective of an actual retrieval, the time taken to conduct the clustering procedure is not included in the retrieval time. The clustering for the database is carried out as follows:

Step 1) The number of clusters, K (K<N), is determined.

Step 2) The features of the cluster centers, $C_1, C_2, \ldots,$ and $C_K$, are initialized. K data are optionally selected from the database, as the initial cluster centers. For an efficient initialization, the minimum distance between two cluster centers is not to be less than a certain threshold value.

Step 3) For the data other than the data selected as the cluster centers, their nearest cluster centers are determined. Each of the determined nearest cluster centers is included in the cluster associated therewith. Thereafter, each cluster center is updated, based on the following expression:

$$C_k = \frac{1}{n(\Phi_k)+1}[n(\Phi_k)C_k + X_i] \qquad \text{[Expression 1]}$$

where, "$X_i$" represents the current element to be added to the current cluster, "$\Phi_k$" represents the current cluster, and "$n(\Phi_k)$" represents the number of elements belonging to the current cluster $\Phi_k$.

Step 4) The third step is repeated for all elements. Thus, a cluster center set "$\Pi^0 = \{C_1, C_2, \ldots, C_k\}$" is finally derived.

Figure 1:
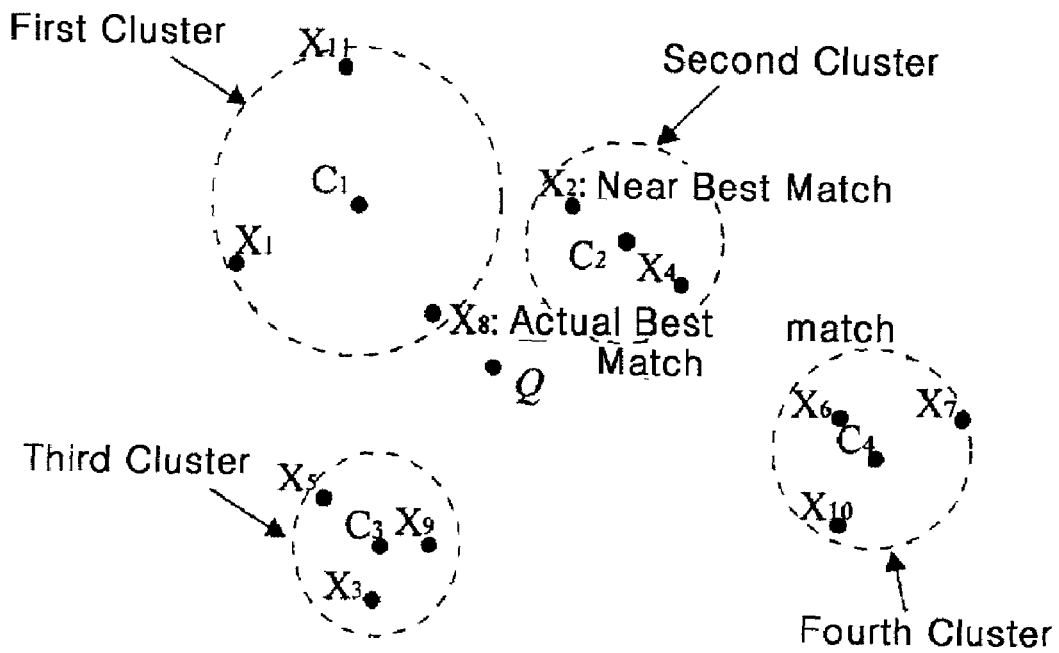
FIG. 1 is a schematic diagram illustrating problems involved in conventional cluster-based search algorithms.

Now, a scheme for solving problems essentially involved in the conventional cluster-based search algorithm shown in FIG. 1 will be described with reference to FIG. 2.

First, an initial minimum distance $d_{min}$ is derived for the cluster nearest to a query Q, as expressed by the following expression:

$$d_{\min} = \min_{X_i \in \Phi_{K_{\min}}} d(X_i, Q) \qquad \text{[Expression 2]}$$

Based on Expression 2, the following expression may be induced:

$$C_{k_{\min}} = \arg C_k \overset{\min}{\in} \prod^0 d(C_k, Q) \qquad \text{[Expression 3]}$$

In Expressions 2 and 3, "d(X, Y)" represents the $L_1$-distance between two features X and Y. In accordance with the conventional algorithm shown in FIG. 1, the initial minimum distance $d_{min}$ corresponds to "$d(X_2, Q)$". Thereafter, the element furthest from the cluster center in each of clusters other than the cluster $\Phi_{k_{min}}$ associated with the initial minimum distance $d_{min}$ is determined. The distance of the furthest element from the cluster center in each cluster, $\delta_k$, is defined as follows:

$$\delta_k = X_i \overset{\max}{\in} \Phi_k d(X_i, C_k) \qquad \text{[Expression 4]}$$

The distance $\delta_k$ of each cluster is calculated and stored in advance. Based on the initial minimum distance $d_{min}$ and $\delta_k$ of each cluster, it is then determined whether or not it is necessary for the current cluster to be searched for in order to achieve an optimal retrieval. For this determination, Inequality Property 1 expressed by the following expression is used:

$$\text{If } d(C_k, Q) - \delta_k > d_{\min}, \text{ then } X_i \overset{\min}{\in} \Phi_k d(X_i, Q) > d_{\min} \qquad \text{[Expression 5]}$$

Expression 5 expressing Inequality Property 1 can be proved as follows:

$$X_{i_{\min}} = \arg X_i \overset{\min}{\in} \Phi_k d(X_i, Q) \qquad \text{[Expression 6]}$$

In accordance with the triangular inequality method, the following inequality can be induced from Expression 5:

$$d(X_{i_{\min}}, Q) \geq d(C_k, Q) - d(X_{i_{\min}}, C_k) \qquad \text{[Expression 7]}$$

In similar, the following inequality can be induced from Expression 4:

$$\delta_k = X_i \overset{\max}{\in} \Phi_k d(X_i, C_k) \geq d(X_{i_{\min}}, C_k) \qquad \text{[Expression 8]}$$

Using Expressions 7 and 8, the following inequality can be obtained:

$$d(X_{i_{\min}}, Q) \geq d(C_k, Q) - d(X_{i_{\min}}, C_k) \geq d(C_k, Q) - \delta_k \qquad \text{[Expression 9]}$$

If $d(C_k, Q) - \delta_k > d_{min}$, the following expression is then established:

$$d(X_{i_{\min}}, Q) = X_{i_{\min}} \overset{\min}{\in} \Phi_k d(X_i, Q) \rangle d_{\min} \qquad \text{[Expression 10]}$$

Thus, the establishment of Expression 5 is proved.

"$d(C_k, Q) - \delta_k$" in Inequality Property 1 means the lower bound of the distance between the query Q and any element in the current cluster $\Phi_k$.

If "$d(C_k, Q) - \delta_k$" is more than "$d_{min}$", this means that there is no element spaced apart from the query Q by a distance less than "$d_{min}$" in the current cluster $\Phi_k$. Accordingly, it is unnecessary to take the current cluster into consideration.

In such a fashion, therefore, it is possible to surely remove all ineffective clusters by applying Inequality Property 1.

However, the procedure for determining the nearest cluster and the procedure for determining the best match still require a considerable quantity of calculation. In order to reduce this calculation quantity, an optimal retrieval method is proposed in accordance with the present invention. According to this optimal retrieval method, another inequality property is induced, based on a multi-resolution data structure. Based on this inequality property, an optimal high-speed retrieval can be achieved.

Figure 3:
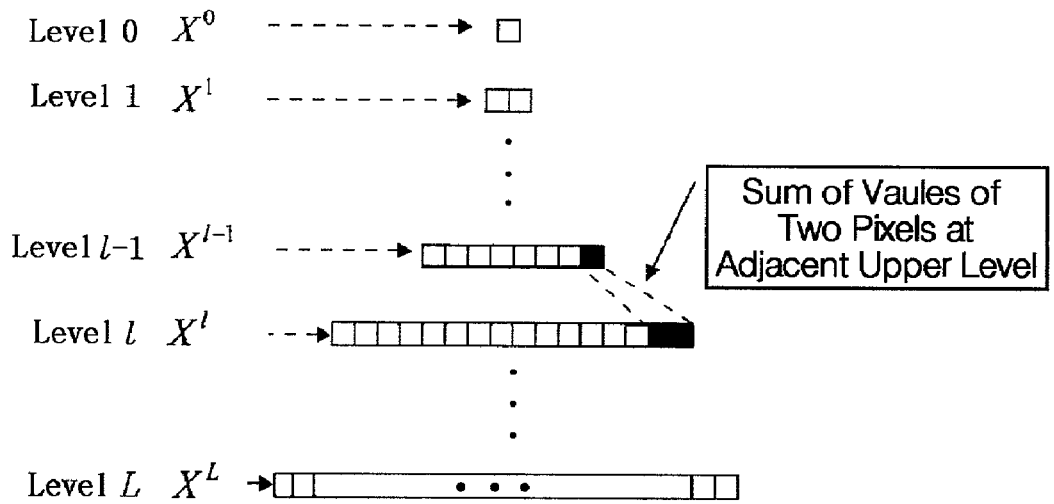
FIG. 3 is a schematic diagram illustrating the multi-resolution data structure of a brightness histogram X having $2^L$ bins.

FIG. 3 is a schematic diagram illustrating the multi-resolution data structure of a brightness histogram X having $2^L$ bins.

For the convenience of description, it is assumed that the multi-resolution data structure illustrated in FIG. 3 is associated with a normalized histogram having B ($B=2^L$) bins. The multi-resolution data structure of the histogram X may be defined by a histogram data stream of "$\{X^0, \ldots, X^1, \ldots, X^L\}$".

Here, X corresponds to "$X^L$". The histogram $X^l$ has $2^l$ bins. This histogram $X^l$ is obtained by reducing the resolution of the histogram $X^{l+1}$ by 50% (½).

Each pixel value of the histogram at the current level is obtained by summing together the values of two pixels in the histogram corresponding to the upper level adjacent to the current level. For example, assuming that $X^l(m)$ represents the value of the m-th bin in the histogram $X^l$, this bin value $X^l(m)$ can be derived as follows:

$$X^l(m) = X^{l+1}(2m-1) + X^{l+1}(2m), \ 1 \leq m \leq 2^l \quad \text{[Expression 11]}$$

Now, another inequality property, that is, Inequality Property 2, used for an optimal high-speed retrieval in a multi-resolution feature space will be described in detail. Inequality Property 2 can be expressed by the following expression:

$$d(X, Y) \equiv d^L(X, Y) \geq d^{L-1}(X, y) \geq \ldots \geq d^l(X, Y) \geq \ldots \geq d^1(X, Y) \geq d^0(X, Y) \quad \text{[Expression 12]}$$

where, "$d^l(X, Y)$" represents the $L_1$-distance between two histograms X and Y at level l, that is, "$d(X^l, Y^l)$".

Expression 12 expressing Inequality Property 2 can be proved as follows:

The $L_1$-distance $d^{l+1}(X, Y)$ between two histograms X and Y at level "l+1" can be derived as follows:

$$d^{l+1}(X, Y) = \sum_{m=1}^{2^{l+1}} |X^{l+1}(m) - Y^{l+1}(m)| \quad \text{[Expression 13]}$$

$$= \sum_{m=1}^{2^l} (|X^{l+1}(2m-1) - Y^{l+1}(2m-1)| + |X^{l+1}(2m) - Y^{l+1}(2m)|)$$

where, each of the histograms $X^{l+1}$ and $Y^{l+1}$ has $2^{l+1}$ bins, and $X^{l+1}(m)$ represents the value of the m-th bin in the histogram $X^{l+1}$.

$$d^l(X, Y) = \sum_{m=1}^{2^l} |X^l(m) - Y^l(m)| \quad \text{[Expression 14]}$$

$$= \sum_{m=1}^{2^l} |X^{l+1}(2m-1) - Y^{l+1}(2m-1) + X^{l+1}(2m) - Y^{l+1}(2m)|$$

where, each of the histograms $X^{l+1}$ and $Y^{l+1}$ has $2^{l+1}$ bins, and $X^{l+1}(m)$ represents the value of the m-th bin in the histogram $X^{l+1}$.

Based on Expression 13, 14 and 15, the following expression can be induced:

$$d^{l+1}(X, Y) = \sum_{m=1}^{2^l} (|X^{l+1}(2m-1) - Y^{l+1}(2m-1)| + \quad \text{[Expression 16]}$$

$$|X^{l+1}(2m) - Y^{l+1}(2m)|)$$

$$\geq \sum_{m=1}^{2^l} |X^{l+1}(2m-1) - Y^{l+1}(2m-1) + X^{l+1}(2m) - Y^{l+1}(2m)|$$

$$= d^l(X, Y)$$

Referring to Expression 16, it can be found that expression 12 is established. Thus, Inequality Property 2 is proved.

Inequality Property 2 means that when "$d^l(X, Y)$" is more than a particular value, "$d^L(X, Y)$" is always more than the particular value.

The distance calculation at an upper level requires an increased computation quantity as compared to that at a lower level. Also, it is possible to remove an increased number of ineffective candidates at the lower level, as compared to the upper level. When such properties are applied to a search procedure, it is possible to considerably reduce the calculation quantity required for the search procedure.

It is assumed that "N" represents the number of data contained in a database I ($I=\{I_1, \ldots, I_i, \ldots, I_N\}$), and "$\Omega^0$" represents a set of the features of the data ($\Omega^0 = \{X_1, \ldots, X_i, \ldots, X_N\}$). The multi-resolution features of each data are previously calculated and stored.

The high-speed multi-resolution exhaustive search algorithm ($MSA_S$) based on Inequality Property 2 can be summarized as follows:

Step 1) The multi-resolution structure of a query Q is derived.

Step 2) The initial minimum distance $d_{min}$ is set to be infinite.

Step 3) Respective values of "i" and "l" are set to be 1.

Step 4) If l=L, the procedure of the algorithm then proceeds to step 6. If "i" is more than "N", the procedure then proceeds to step 7.

Step 5) The value of "$d^l(X_i, Q)$" is derived. If "$d^l(X_i, Q)$" is more than "$d_{min}$", the current candidate $X_i$ is then removed. Thereafter, respective values of "i" and "l" are updated with "i+1" and "1". If not, the value of "l" is updated with "i+1". Subsequently, the procedure then returns to step 3.

Step 6) If "$d^L(X_i, Q)$" is more than "$d_{min}$", the current candidate $X_1$ is then removed. If not, "$d_{min}$" is updated with "$d^L(X_i, Q)$". Respective values of "i" and "l" are updated with "i+1" and "1". Thereafter, the procedure returns to step 4.

Step 7) data having the final "$d_{min}$" is selected as the best match.

As apparent from the above description, the multi-resolution features of each data contained in the database are previously calculated, and then stored. However, the quantity of calculation for the multi-resolution features of query data should be taken into consideration because those multi-resolution features must be obtained within a search time.

In the case of, for example, normalized brightness histogram features, only 254 additions are required in obtaining a desired multi-resolution histogram because the number of levels is 8. Accordingly, the quantity of calculation for the multi-resolution brightness histogram may be negligible, taking into consideration the fact that 511 additions and 256 absolute value computations are required for one matching procedure.

Meanwhile, although it is necessary to use an additional memory for storing multi-resolution histograms, such a memory addition may be negligible because the size of each histogram is considerably smaller than that of associated data. The same conditions are applied to other features.

Now, a new cluster-based multi-resolution search algorithm (CMSA) for achieving an optimal high-speed information retrieval, using the optimal cluster removal condition according to Inequality Property 1 and the MSAs based on Inequality Property 2 will be described.

Once a query is given, the cluster center nearest to the query is first determined in accordance with $MSA_S$. The distance $d_{min}$ between the query and the initial best match of the cluster associated with the nearest cluster center is then derived.

Thereafter, the best match(es) are determined by applying $MSA_S$ to clusters, expected as having those best matches, in accordance with the cluster removal condition based on Inequality Property 1. Since the determination of the nearest cluster center is carried out based on $MSA_S$, there is no any value of "$d^L(C_k, Q)$" calculated in the cluster removal procedure.

This is because if "$d^{l_k}(C_k, Q)$" is more than "$d_{min}$", the distances $d^{l_k+1}(C_k, Q), \ldots, d^L(C_k, Q)$ at respective levels higher than the $l_k$-th level are not calculated.

For this reason, there is a problem in that it is necessary to calculate again values of "$d^L(C_k, Q)$" for an introduction of Inequality Property 1, expressed by Expression 5, in the cluster removal procedure.

To this end, Inequality Property 1 is modified into Inequality Property 1.1 using the relation "$d(C_k, Q) \equiv d^L(C_k, Q) \geq d^{l_k}(C_k, Q)$", as follows:

$$\text{If } d^{l_k}(C_k, Q) - \delta_k > d_{min}, \text{ then } X_i \stackrel{min}{\in} \Phi_k d(X_i, Q) > d_{min} \quad \text{[Expression 17]}$$

where, $l_k \leq L$

In accordance with Inequality Property 1.1, where "$d^{l_k}(C_k, Q) - \delta_k$" is more than "$d_{min}$", it is possible to remove the current cluster $\Phi_k$ without any loss.

On the other hand, where "$d^{l_k}(C_k, Q) - \delta_k$" is less than "$d_{min}$", the current cluster $\Phi_k$ is searched because the best match may be present in the current cluster $\Phi_k$. For this determination, there is no additional quantity of calculation because the values $d^{l_k}(C_k, Q)$ and $\delta_k$ associated with each cluster are known in advance.

Two CMSAs based on the above mentioned inequality properties are proposed according to the number of output best matches.

The first algorithm is a $CMSA_S$ adapted to output a single best match, and the second algorithm is a $CMSA_M$ adapted to output a plurality of best matches.

The $CMSA_S$ mainly involves three processing steps. In accordance with this $CMSA_S$, "$C_{k_{min}}$" is first determined using $MSA_S$. The initial minimum distance don is then derived from "$\Phi_{k_{min}}$". Finally, $MSA_S$ is applied to candidate clusters selected in accordance with Inequality Property 1.1, thereby determining the best match. The search procedure according to $CMSA_S$ can be summarized as follows:

Step 1) $MSA_S$ is carried out to determine the cluster $k_{min}$ having a minimum distance $d'_{min}$.

Step 2) $MSA_S$ is applied to "$\Phi_{k_{min}}$" under condition in which it is assumed that the initial "$d_{min}$" corresponds to "$d'_{min}$", thereby updating "$d_{min}$" as follows:

$$d_{min} = X_i \stackrel{min}{\in} k_{min} d^L(X_i, Q) \quad \text{[Expression 18]}$$

Step 3-1) "k" is set to "1".

Step 3-2) If $k=k_{min}$, "k" is updated with "k+1". On the other hand, if k>K, the procedure proceeds to step 3-4.

Step 3-3) If "$d^{l_k}(C_k, Q) - \delta_k$" is more than "$d_{min}$", the current cluster is removed. If not, "$d_{min}$" is updated by applying $MSA_S$ to "$\Phi_k$". After "k" is updated with "k+1", the procedure returns to step 3-2.

Step 3-4) Data having the final "$d_{min}$" is selected as the best match.

In accordance with $CMSA_M$, "$C_{k_{min}}$" is first determined in the same fashion as that in $CMSA_S$. Thereafter, a minimum distance arrangement shown in FIG. 4 and adapted to store respective distance values of M more-significant best matches is filled with those best matches in accordance with a rule to be described hereinafter.

Figure 4:
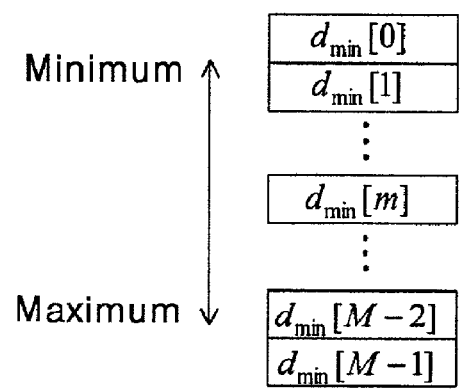
FIG. 4 is a diagram schematically illustrating a minimum distance arrangement of M more-significant best matches.

FIG. 4 is a diagram schematically illustrating a minimum distance arrangement of M more-significant best matches.

If $n(\Phi_{k_{min}}) \geq M$, M more-significant best matches are filled in the arrangement in the ascending order, starting from that having the lowest value.

If $n(\Phi_{k_{min}}) < M$, respective distances of all elements present in "$\Phi_{k_{min}}$" are calculated. The calculated values are stored in the arrangement in the ascending order, starting from the lowest value. The remaining elements, not filled with the calculated values, in the arrangement are stored with the infinite value. Using a modified $MSA_S$, it is possible to determine M more-significant best matches present in "$\Phi_{k_{min}}$". This modified algorithm is referred to as "$MSA_M$". This $MSA_M$ can be summarized as follows:

Step 1) The multi-resolution features of the query Q are derived.

Step 2) All elements present in "$d_{min}[.]$" are initialized with the infinite value.

Step 3) "i" and "l" are set to "1", respectively.

Step 4) If l=L, the procedure proceeds to step 6. If $i > n(\Phi_{k_{min}})$ the procedure proceeds to step 7.

Step 5) "$d^l(X_i, Q)$" is calculated. If $d^l(X_i, Q) > d_{min}[M-1]$, the current candidate $X_i$ is removed. Thereafter, "i" and "l" are updated with "i+1" and "1", respectively. Following this updating, the procedure returns to step 3. If $d^l(X_i, Q) \leq d_{min}[M-1]$, "l" is updated with "l+1". Following this updating, the procedure returns to step 3.

Step 6) If $d^L(X_i, Q) > d_{min}[M-1]$, the current candidate $X_j$ is removed. If not, "$d_{min}[M-1]$" is updated with "$d^L(X_i, Q)$". Following this updating, "$d_{min}[.]$" is arranged in the ascending order, starting from the lowest value. Thereafter, "i" and "l" are updated with "i+1" and "1", respectively. Following this updating, the procedure returns to step 4.

Step 7) Finally, M data left in "$d_{min}[.]$" are selected as M most-significant best matches.

As mentioned above, the updating of "$d_{min}[.]$" is carried out by conducting the filling of "$d_{min}[.]$" while applying $MSA_M$ to "$\Phi_{k_{min}}$", and then applying $MSA_M$ to each of those selected from the remaining clusters in accordance with Inequality Property 1.1.

Finally, data corresponding to "$d_{min}[.]$" are selected as M more-significant best matches. Even in the case using the above-mentioned search algorithm, it may be practically impossible to accurately search for M more-significant best matches.

Figure 5:
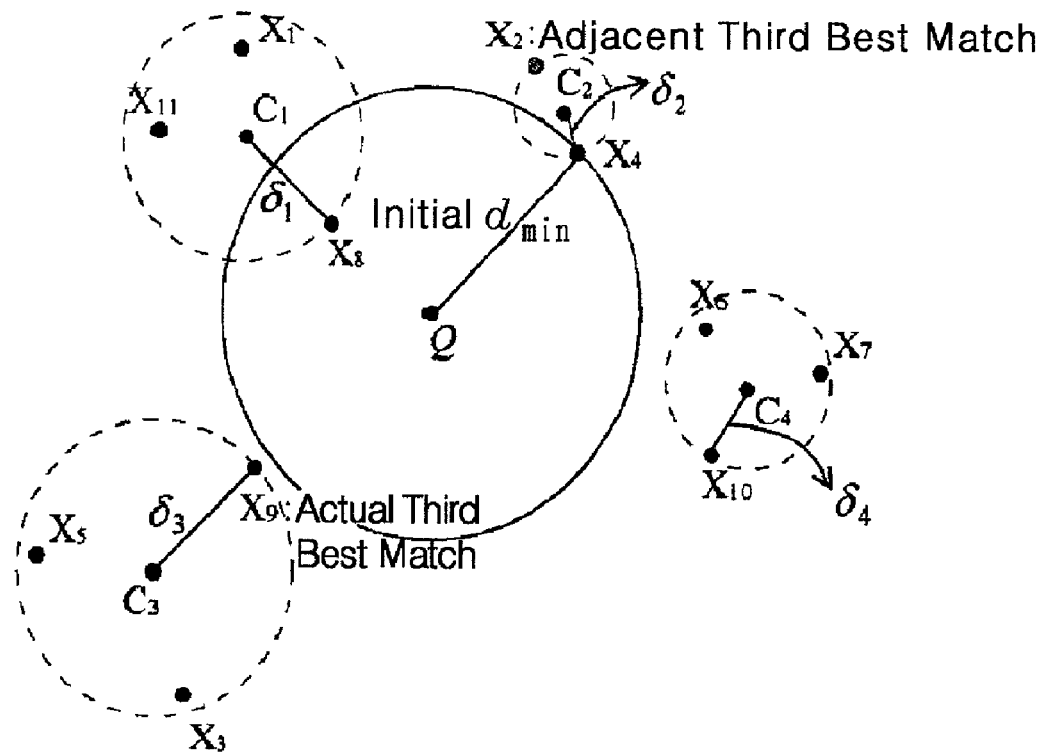
FIG. 5 is a schematic diagram illustrating an example in which an erroneous determination for best matches is made.

FIG. 5 is a schematic diagram illustrating an example in which an erroneous determination for best matches is made.

Although $X_8$, $X_4$, and $X_2$ are selected as three more-significant best matches in the case of FIG. 5, the actual third best match is not $X_2$, but $X_9$. To this end, a cluster removal condition relaxed from Inequality Property 1.1 may be induced by substituting "$d_{min}$" for "$d_{min}[M-1]$". That is, the following Inequality Property 1.2 may be induced:

If $d(C_k, Q) - \delta_k > d_{\min}[M-1]$, [Expression 19]

then $X_i \overset{\min}{\in} \Phi_k d(X_i, Q) > d_{\min}[M-1]$

When the above inequality property is employed as a post-processing involved in the algorithm proposed in accordance with the present invention, it is always possible to accurately search for M more-significant best matches. The final $CMSA_M$ using the above mentioned inequality properties can be summarized as follows:

Step 1) The cluster ken having the minimum distance $d'_{min}$ is searched for, as in step 1 of $CMSA_S$.

Step 2) If $n(\Phi_{k_{min}}) \geq M$, M more-significant best matches are searched for in accordance with $MSA_M$. Respective distance values of the searched more-significant best matches are stored in "$d_{min}[.]$". On the other hand, if $n(\Phi_{k_{min}}) < M$, $n(\Phi_{k_{min}})$ distance values are filled in "$d_{min}[.]$" in the ascending order, starting from the lowest value. The remaining elements of the arrangement are stored with the infinite value.

Step 3-1) "k" is set to "1".

Step 3-2) If $k=k_{min}$, "k" is updated with "k+1". On the other hand, if k>K, the procedure proceeds to step 3-5.

Step 3-3) If $d^{l_k}(C_k, Q) - \delta_k > d_{min}[0]$, the cluster k is removed. After "k" is updated with "k+1", the procedure returns to step 3-2.

Step 3-4) If $d^{l_k}(C_k, Q) - \delta_k \leq d_{min}[0]$, "$d_{min}[.]$" is updated by applying $MSA_M$ to "$\Phi_k$". After "k" is updated with "k+1", the procedure returns to step 3-2.

Step 3-5) "k" is set to "1".

Step 3-6) If it is determined that the cluster k has been searched for at step 3-4, "k" is then updated with "k+1". If k>K, the procedure proceeds to step 3-9.

Step 3-7) If $d^{l_k}(C_k, Q) - \delta_k > d_{min}[M-1]$, the cluster k is removed. After "k" is updated with "k+1", the procedure returns to step 3-6.

Step 3-8) If $d^{l_k}(C_k, Q) - \delta_k \leq d_{min}[M-1]$, "$d_{min}[.]$" is updated by applying $MSA_M$ to "$\Phi_k$". After "k" is updated with "k+1", the procedure returns to step 3-6.

Step 3-9) M data corresponding to the final "$d_{min}[.]$" are selected as the top M best matches.

As apparent from the above description, the following advantages are obtained in accordance with the optimal high-speed multi-resolution retrieval method on a large capacity database proposed by the present invention.

First, the method of the present invention can be used as the important module of a search engine for any system used for a high-speed optimal retrieval on a large capacity database, for example, an image or video database.

Second, the method of the present invention is applicable to any multimedia database, which is capable of having a multi-resolution structure for image or audio data, to accurately and rapidly search the database for desired information.

What is claimed is:

1. An optimal high-speed multi-resolution retrieval method on a large capacity database comprising the steps of:
   deriving the multi-resolution structure of a query "Q";
   setting an initial minimum distance "$d_{min}$" to have the infinite value;
   setting respective values of "i" and "l" to be "1";
   deriving "$d^1(X_i, Q)$", where $d^1(X_i, Q)$ is a distance between a histogram $X_i$ and query Q at a level 1;
   deriving "$d^L(X_i, Q)$", where $d^L(X_i, Q)$ is a distance between a histogram $X_i$ and query Q at a level L;
   based on results of the steps of deriving $d^l$ and $d^L$, obtaining a final value of "$d_{min}$"; and
   selecting data having the final value of "$d_{min}$" as the best match.
   wherein the high-speed multi-resolution retrieval on the database is carried out using an inequality property expressed by the following expression:

$d(X,Y) \equiv d^L(X,Y) \geq d^{L-1}(X,y) \geq \ldots \geq d^l(X,Y) \geq \ldots \geq d^1(X,Y) \geq d^0(X,Y)$.

2. The optimal high-speed multi-resolution retrieval method according to claim 1, wherein the step of deriving "$d^l(X_i, Q)$" comprises the steps of:
   if "$d^l(X_i, Q)$" is more than "$d_{min}$", then removing the current candidate "$X_i$", and updating respective values of "i" and "l" with "i+1" and "1"; and
   if "$d^l(X_i, Q)$" is not more than "$d_{min}$", then updating "l" with "i+1".

3. The optimal high-speed multi-resolution retrieval method according to claim 1, wherein the step of deriving "$d^L(X_i, Q)$" comprises the steps of:
   if "$d^L(X_i, Q)$" is more than "$d_{min}$", then removing the current candidate "$X_i$"; and
   if "$d^L(X_i, Q)$" is not more than "$d_{min}$", then updating "$d_{min}$" with "$d^L(X_i, Q)$", and updating respective values of "i" and "l" with "i+1" and "1".

4. An optimal high-speed multi-resolution retrieval method using a cluster-based multi-resolution search algorithm adapted to output one best match, comprising the steps of:
   performing a high-speed multi-resolution exhaustive search algorithm, thereby searching for a cluster "$k_{min}$" having a minimum distance "$d'_{min}$";
   setting an initial value of the "$d_{min}$" to "$d'_{min}$", applying the high-speed multi-resolution exhaustive search algorithm to "$\Phi_{k\ min}$", thereby updating "$d_{min}$";
   deriving "$d^{l_k}(C_k, Q) - \delta_k$";
   selecting data having a final value of "$d_{min}$" as the best match;
   if "$d^{l_k}(C_k, Q) - \delta_k$" is more than "$d_{min}$", removing the cluster "k";
   if "$d^{l_k}(C_k, Q) - \delta_k$" is not more than "$d_{min}$", applying the high-speed multi-resolution exhaustive search algorithm to "$\Phi_k$", thereby updating "$d_{min}$"; and
   updating "k" with "k+1".

5. The optimal high-speed multi-resolution retrieval method according to claim 4, wherein the high-speed multi-resolution retrieval using the cluster-based multi-resolution search algorithm is carried out using an inequality property expressed by the following expression:

$$\text{If } d^{l_k}(C_k, Q) - \delta_k > d_{\min}, \text{ then } X_i^{\min} \in \Phi_k d(X_i, Q) > d_{\min} \quad 5$$

where, $l_k \neq L$.

6. The optimal high-speed multi-resolution retrieval method according to claim 4, wherein "$d_{min}$" is updated with a value expressed by the following expression:

$$d_{\min} = X_i^{\min} \in \Phi_{k_{\min}} d^L(X_i, Q),$$

Further comprising the steps of:
setting "k" to "1"; and
if $k = k_{min}$, updating "k" with "k+1".

7. An optimal high-speed multi-resolution retrieval method using a cluster-based multi-resolution search algorithm adapted to output a plurality of more-significant best matches, comprising the steps of:
  performing a high-speed multi-resolution exhaustive search algorithm, thereby searching for a cluster "$k_{min}$" having a minimum distance "$d_{min}$";
  if n ($\Phi_{k_{min}}$) ∃ M, searching for M more-significant best matches in accordance with an algorithm modified from the high-speed multi-resolution exhaustive search algorithm to search for the M more-significant best matches, and storing respective distance values of the searched more-significant best matches "$d_{min}[\cong]$";
  setting "k" to "1", and if $k = k_{min}$, updating "k" with "k+1";
  if $d^{l_k}(C_k, Q) - \delta > d_{min}[0]$, removing the cluster "k", and updating "k" with "d+1";
  setting "k" to "1", and if it is determined that the cluster "k" gas been searched for, updating "k" with "k+1"; if $d^{l_k}(C_k, Q) - \delta_k > d_{min}[M-1]$, removing the cluster "k", and updating "k" with "d+1";
  updating "$d_{min}[\cong]$" while applying the modified high-speed multi-resolution exhaustive search algorithm to "$\Phi_k$", and updating "k" with "k+1"; and
  selecting M data corresponding to a final "$d_{min}[\cong]$" as best matches, respectively.

8. The optimal high-speed multi-resolution retrieval method according to claim 7, wherein the high-speed multi-resolution retrieval using the cluster-based multi-resolution search algorithm is carried out using an inequality property expressed by the following expression:

$$\text{If } d^{l_k}(C_k, Q) - \delta_k > d_{\min}[M-1], \text{ then } X_i^{\min} \in \Phi_k d(X_i, Q) > d_{\min}[M-1].$$

9. The optimal high-speed multi-resolution retrieval method according to claim 7, further comprising:
  if n ($\Phi_{k_{min}}$) < M, filling if n ($\Phi_{k_{min}}$) distance values in "$d_{min}[\cong]$" in the order of higher values, starting from the lowest value, and storing the remaining elements of "$d_{min}[\cong]$" with the infinite value.

* * * * *